3,728,219
CONTROL ROD DRIVE IN THE INTERIOR OF A PRESSURE VESSEL
Jean Mattern, Fischbach, and Peter Daublebsky and Gunter Zeitzschel, Frankfurt, Germany, assignors to Licentia Patent-Verwaltungs-G.m.b.H., Frankfurt am Main, Germany
Filed Aug. 11, 1971, Ser. No. 170,878
Claims priority, application Germany, Aug. 11, 1970, P 20 39 845.2
Int. Cl. G21c 7/16
U.S. Cl. 176—36 R  3 Claims

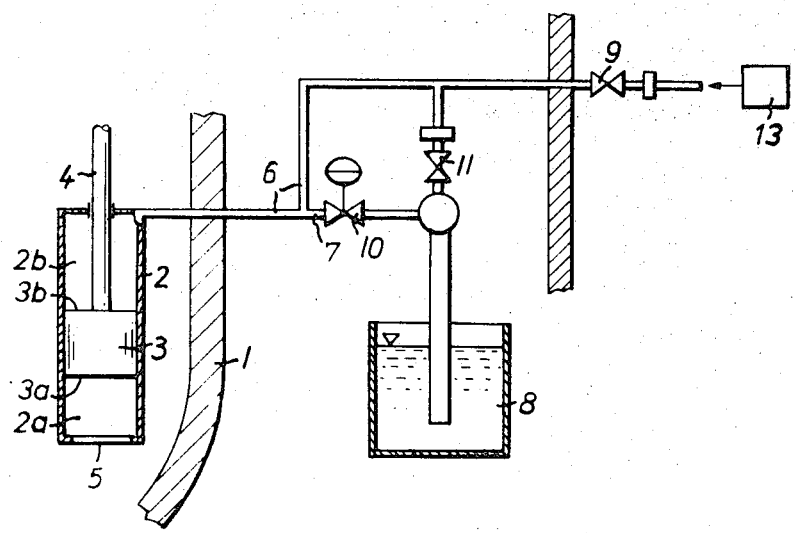

ABSTRACT OF THE DISCLOSURE

In an operating system for a hydraulic or pneumatic control rod drive of a nuclear reactor including a lifting cylinder within the pressure vessel of the reactor and a lifting piston within the lifting cylinder and connected to the control rod which extends into the reactor core, the system including a line leading to an external pressure source and the lifting cylinder being in direct communication with the pressure medium in the pressure vessel on the side of the lifting piston facing the reactor core for urging the control rods into the core and a counter pressure produced within the lifting cylinder by the pressure source communicating therewith through the line for removing the control rods from the reactor core.

BACKGROUND OF THE INVENTION

The present invention relates to nuclear reactors, and more particularly to an operating system for the drive for the control rods of nuclear reactors.

In many types of nuclear reactors it is known in order to control the output and uniform fuel consumption of the reactors, to insert control rods bearing a neutron absorbing material thereon to a varying length extent into the reactor core.

Such control rods are driven in their normal mode of operation in such a manner that it is possible to perform thereon a fine adjustment. However, it is not possible, in the case of an emergency for example, to drive the control rods using known drives so that they enter into the reactor core sufficiently rapidly.

In the book entitled "Steuerung und Regelung von Kernreaktoren und Kernkraftwerken" (Control and Regulation of Nuclear Reactors and Nuclear Power Plants) by Schulz and published by Berliner Union of Stuttgart, 1965, 2nd Edition, pages 255 et seq., a hydraulic piston drive for reactor control rods is disclosed. The hydraulic piston drive is disposed inside the reactor pressure vessel and the fluid for the hydraulic system needed to actuate the hydraulic piston within a lifting cylinder is brought into the pressure vessel through two external leads. This arrangement of the control rod drive inside the pressure vessel substantially simplifies the manufacture of the pressure vessel bottom or cover since instead of the studs which are used for the externally disposed drives and which have a relatively large diameter, only lines need be brought out of the pressure vessel. Schultz also proposes to use the coolant or moderator medium of the nuclear reactor as the hydraulic medium.

Such a known arrangement of a drive for reactor control rods possesses a drawback from the standpoint of safety. That is, with a malfunction of the hydraulic means serving as the driving means, which can happen, for example, because of a break in the feeder line, the control rod can no longer be pushed into the reactor core. In fact, the control rod might even be expelled from the core because of the pressure existing therein. This danger is of particular concern when the control rods are disposed below the reactor core as is customary today for boiling water and pressurized water type reactors.

A known external control rod drive is that disclosed in German Pat. No. 1,218,080. There, the driving means for pushing the control rods into the reactor core is the pressure medium from the reactor core. With such a drive it is necessary during normal operation to charge the area above the lifting cylinder with a counter pressure. In the event that a dangerous situation is encountered, the counter pressure above the lifting cylinder is reduced by opening a control valve and permitting the counter pressure to communicate with a chamber which is under atmospheric pressure. The pressure medium below the lifting cylinder then drives the control rod into the reactor core. This embodiment, aside from the fact that it has the drawbacks of external control rod drives, also exhibits the safety defect of the Schulz control rod drive. That is, if a break occurs in the feeder line for the hydraulic medium, the control rods can no longer be pushed into the core by hydraulic means.

SUMMARY OF THE INVENTION

It is, therefore, the object of the present invention to provide an operating system for a hydraulic or pneumatic control rod drive which drive is situated inside the pressure vessel of a nuclear reactor, which is particularly simple in construction, safe and economic to operate, requires minimum passages through the pressure vessel, and provides that in the event of a malfunction of the portion of the system which delivers an externally provided drive medium to the control rod drive, the control rods are automatically driven into the reactor core.

This as well as other objects are accomplished for an operating system for a hydraulic or pneumatic nuclear reactor control rod drive in which the drive is located within the pressure vessel and is provided with a lifting piston arrangement for moving the control rods. The lifting piston is situated within a lifting cylinder such that one face thereof is exposed to the pressure medium within the pressure vessel and the other face thereof is subjected to a counter pressure communicated thereto through a line from a source outside of the pressure vessel. The pressure medium within the pressure vessel serves as the drive medium for the piston. The portion of the line outside the pressure vessel is provided with a branch line with a rapid cut-off valve which leads to a chamber under atmospheric pressure. The portion of the line outside the pressure vessel is further provided with a line which bypasses the rapid cut-off valve and which is provided with a controllable valve.

BRIEF DESCRIPTION OF THE DRAWING

The single drawing figure is a schematic illustration of a preferred embodiment of the invention and shows the internal and external portions of an operating system.

DESCRIPTION OF THE PREFERRED EMBODIMENTS

Referring to the drawing which represents a water-moderated and gas-cooled nuclear reactor, although it should be noted, however, that a control rod drive according to the principle of the present invention can also be used, for example, in a gas-cooled nuclear reactor, a reactor pressure vessel 1 is shown in which a lifting cylinder 2 with a lifting piston 3 bearing a piston rod 4 is disposed below the reactor core (not shown). The piston rod 4 is connected with a control rod which is also not shown.

The control rod drive itself will preferably be of the type disclosed in U.S. patent application Ser. No. 150,360 filed on June 7, 1971 by Peter Daublebsky and Gunter Zeitzschell, entitled "Nuclear Reactor Control Rod Drives," and assigned to the assignee of the present application, and corresponding to German application Ser. No. P 20 27 988.3.

Movement of the lifting piston 3 within the lifting cylinder 2 causes the control rod to be pushed into the reactor core to a varying extent. On the side 3a of the lifting piston 3 facing away from the reactor core the lifting cylinder 2 is provided with an opening 5 so that the pressure in the reactor pressure vessel 1 can act within the space 2a and therefore on the side 3a. The space 2b in the lifting cylinder 2 on the side 3b of the lifting piston 3 facing the reactor core is sufficiently sealed against the pressure medium in the reactor vessel 1 so that pressure communication therebetween is avoided. A line 6 is connected via a valve 9 with a device 13 for producing a counter pressure within the space 2b. The counter pressure producing device is disposed outside of the reactor pressure vessel 1. The line 6 has a branch line 7 which leads through a so-called scram valve 10 to a condensation chamber 8 which is under atmospheric pressure.

The above-described control rod drive operates as follows.

To remove the control rods from the reactor core, a pressure medium is delivered from the pressure source through valve 9 and line 6 into the space 2b of the lifting cylinder 2. For this purpose, device 13 connected to line 6 may be, for example, the primary water cleaning pump and/or the bearing pressure water pump of the reactor. Since the reactor pressure acts on the side 3a of the lifting piston 3 facing away from the reactor core, the added pressure or counter pressure must be higher than the pressure in the reactor vessel 1.

When rapid cut-off must occur, the above mentioned scram valve 10 can serve to reduce the pressure in the space 2b of the lifting cylinder 2 because it connects space 2b via line 6 and branch line 7 with the pressure in the condensation chamber 8 which is less than the pressure in space 2b. The lifting piston 3 and the control rod can, as a result be very rapidly moved upwardly so that the control rod enters the reactor core.

If the pressure medium moving the control rod should suddenly fail, which could happen, for example, as a result of a break in line 6, the pressure in space 2b and therefore on the side 3b of the lifting piston 3 facing the reactor core would also be reduced very rapidly and the control rod would be driven just as rapidly by the pressure of the reactor vessel in the space 2a and against side 3a into the reactor core. Thus, a malfunction in the operating system of the control rod drive does not produce a dangerous condition in the reactor. This is extremely important so that safety requirements for nuclear reactors can be met.

Independent of the rapid cutoff case, a fine adjustment for the control rods can be effected by a change in pressure in the space 2b of the lifting cylinder 2 via line 6 and valve 11. With the appropriate measures at lifting piston 3 and lifting cylinder 2 care must be taken that this fine adjustment by precisely prescribed values becomes possible.

Thus line 6 and its connecting portions serve to effect rapid cut-off and normal inward and outward movement of the control rods.

If the reactor has not reached its required pressure level (starting range), it is possible to use, for example, compressed air in the pressure vessel as the pressure reservoir for the upward movement of the piston 3. It would also be conceivable to connect the drive to an external pressure reservoir, but this would have to be via a second passage (not shown).

Some of the advantages of an operating system for a hydraulic or pneumatic control rod drive inside a pressure vessel as provided by the present invention are that rapid cut-off occurs automatically when there is a break in the drive medium line or any other malfunction causing a lack of driving; that the cost of such a rapid cut-off system is substantially less when compared to known embodiments with the added advantage of an increase in safety; and that only a single passage through the reactor pressure vessel wall is required.

It will be understood that the above description of present invention is susceptible to various modifications, changes and adaptations, and the same are intended to be comprehended within the meaning and range of equivalents of the appended claims.

We claim:

1. In an operating system for a hydraulic or pneumatic control rod drive of a nuclear reactor, the reactor including a pressure vessel, a reactor core and a lifting cylinder both within the pressure vessel, a lifting piston within the lifting cylinder and a control rod connected with the piston and extending into the core, and the driving medium for the control rod drive being provided by the pressure medium within the pressure vessel, the improvement comprising: a line connecting said lifting cylinder with a pressure source, said line including a branch line containing a rapid cut-off valve, both said pressure source and said cut-off valve being disposed outside of said pressure vessel, said branch line leading to a chamber under atmospheric pressure; and a bypass for said cut-off valves, said bypass containing a control valve, and wherein said lifting cylinder is in direct contact with the pressure medium in the pressure vessel on the side of the lifting piston facing away from the reactor core, said lifting cylinder is sealed from the pressure medium in the pressure vessel on the side of the lifting piston facing the reactor core, and wherein said line is connected at a point of said cylinder to cause the counter pressure established within said lifting cylinder by said pressure source to be in a direction which urges the control rods away from the core.

2. An operating system as defined in claim 1, wherein said pressure source comprises a primary water cleaning pump provided for the reactor.

3. An operating system as defined in claim 1, wherein said pressure source comprises a bearing pressure water pump provided for the reactor.

References Cited
UNITED STATES PATENTS 3,031,397  4/1962  Fortescue et al. ____ 176—36 R

OTHER REFERENCES

"Control of Nuclear Reactors and Power Plants," by Schulz, 1955, pp. 111, 112.

CARL D. QUARFORTH, Primary Examiner

H. E. BEHREND, Assistant Examiner